United States Patent [19]

Horst

[11] Patent Number: 5,122,697
[45] Date of Patent: Jun. 16, 1992

[54] HYBRID SINGLE-PHASE VARIABLE RELUCTANCE MOTOR

[75] Inventor: Gary E. Horst, St. Louis County, Mo.

[73] Assignee: Emerson Electric Co., St. Louis, Mo.

[21] Appl. No.: 516,280

[22] Filed: Apr. 30, 1990

[51] Int. Cl.$^5$ ................ H02K 21/38; H02K 29/00
[52] U.S. Cl. .................... 310/181; 310/67 R; 310/186; 310/269; 318/138
[58] Field of Search ............... 310/67 R, 68 R, 49 R, 310/154, 181, 186, 162, 190, 254, 269; 318/138, 701, 778, 798

[56] References Cited
U.S. PATENT DOCUMENTS

| | | | |
|---|---|---|---|
| 4,549,104 | 10/1985 | Nimura et al. | 310/67 R |
| 4,616,165 | 10/1986 | Compter | 318/701 |
| 4,728,833 | 3/1988 | Shiraki et al. | 310/67 R |
| 4,804,873 | 2/1989 | Shiraki et al. | 310/67 R |
| 4,940,912 | 7/1990 | Kant et al. | 318/138 |
| 5,030,868 | 7/1991 | Suzuki et al. | 310/67 R |

Primary Examiner—Steven L. Stephan
Assistant Examiner—D. L. Rebsch
Attorney, Agent, or Firm—Polster, Polster & Lucchesi

[57] ABSTRACT

A hybrid single-phase variable reluctance motor includes a stator with four inwardly salient teeth evenly spaced around a central core. A phase winding is operatively associated with two diametrically opposed stator teeth. Energization of the phase winding causes a temporary magnetization of those two teeth. A rotor disposed for rotation in the central bore has two outwardly salient teeth disposed generally at 180 degrees with respect to each other. A single permanent magnet is disposed adjacent the central bore at the end of one of the stator teeth other than the two having phase windings. A position sensor is disposed at the fourth stator tooth for detecting the rotational position of the rotor in the central bore. The position sensor is disposed in one quadrant of the motor in which the flux resulting from the permanent magnet and the flux resulting from the energization of the phase winding are in the same direction.

35 Claims, 4 Drawing Sheets

HYBRID SINGLE-PHASE VARIABLE RELUCTANCE MOTOR

BACKGROUND OF THE INVENTION

This invention relates to variable reluctance motors, and more particularly to single-phase variable reluctance motors particularly suited for use as fan motors or in other low starting torque applications.

In any simple magnetic circuit, consisting of a fixed and a movable flux-carrying element, the movable element will tend to assume a position such that the reluctance of the magnetic circuit is a minimum. A reluctance force is exerted on the movable piece to try to make it assume this position of minimum reluctance.

In a variable reluctance motor, both the fixed element (the stator) and the movable element (the rotor) are salient, having teeth on both the stator and the rotor, with phase windings only on the stator poles. As a result, the variable reluctance motor, and particularly the single-phase variable reluctance motor has a simple and relatively inexpensive construction.

The design is not, however, without its disadvantages. For example, starting torque for these machines is low. But that is not a problem for low torque applications such as fans. One more significant problem with single-phase variable reluctance motors is that the rotor may assume a position at rest from which it is impossible to start the motor. This position is, of course, the minimum reluctance position.

U.S. Pat. No. 4,616,165 to Compter addresses this problem by providing a pair of off-center permanent magnets adjacent the rotor to ensure that the rotor always assumes a preferred stationary position from which starting in a desired direction is possible. The motor of this patent, however, could be improved. The two permanent magnets add complexity to the motor. Moreover, the asymmetrical placement of these magnets has complex effects on the torque applied to the rotor.

SUMMARY OF THE INVENTION

Among the various objects and features of the present invention are the provision of a low cost variable speed reluctance motor.

Another object is the provision of such a motor which always starts in the preferred direction.

A third object is the provision of such a motor in which the torque of the stator windings is assisted by a single permanent magnet.

A fourth object is the provision of such a motor in which sensing the rotary position of the rotor is easily accomplished with minimal structural alteration to a standard stator configuration.

A fifth object is the provision of such a motor which provides rotor torque when the coil-excited reluctance torque is zero or negligible.

A sixth object is the provision of such a motor with an extremely simple electronics control package.

Other objects and features will be in part apparent and in part pointed out hereinafter.

Briefly, in a first aspect of the present invention the hybrid single-phase variable reluctance motor includes a stator having first, second, third and fourth inwardly salient teeth terminating at a central bore, which teeth are generally evenly spaced around the central bore. A phase winding is operatively associated with the first and second stator teeth, the first and second stator teeth being diametrically disposed with respect to each other across the central bore. Energization of the phase winding causes a temporary magnetization of the first and second stator teeth. A rotor having two outwardly salient teeth disposed generally at 180 degrees with respect to each other is disposed for rotation in the central bore. A permanent magnet is disposed adjacent the central bore at the end of the third stator tooth. And a rotor position detecting sensor is disposed at the fourth stator tooth for detecting the rotational position of the rotor in the central bore.

In a second aspect the hybrid single-phase variable reluctance motor of the present invention includes a stator having first, second, third and fourth inwardly salient teeth terminating at a central bore. A phase winding is operatively associated with the first and second stator teeth, the first and second stator teeth being diametrically disposed with respect to each other across the central bore. Energization of the phase winding causes a temporary magnetization of the first and second stator teeth. A rotor having two outwardly salient teeth disposed generally at 180 degrees with respect to each other is disposed for rotation in the central bore. And a permanent magnet is disposed adjacent the central bore at a location on one side of a line drawn between the first and second stator teeth, there being no permanent magnet on the other side of that line drawn between the first and second stator teeth. The permanent magnet is disposed at the end of the third stator tooth.

In a third aspect of the present invention the hybrid single-phase variable reluctance motor includes a stator having first, second, third and fourth inwardly salient teeth terminating at a central bore, the four teeth being generally evenly spaced around the central bore. A phase winding is operatively associated with the first and second stator teeth, the first and second stator teeth being diametrically disposed with respect to each other across the central bore. Energization of the phase winding causes a temporary magnetization of the first and second stator teeth. A rotor having two outwardly salient teeth disposed generally at 180 degrees with respect to each other is disposed for rotation in the central bore. And a permanent magnet is disposed adjacent the central bore at the end of the third stator tooth. The permanent magnet is generally ninety degrees from each of the first and second stator teeth.

In a fourth aspect the hybrid single-phase variable reluctance motor of the present invention includes a stator having first, second, third and fourth inwardly salient teeth terminating at a central bore. A phase winding is operatively associated with the first and second stator teeth, the first and second stator teeth being diametrically disposed with respect to each other across the central bore. Energization of the phase winding causes a temporary magnetization of the first and second stator teeth. A rotor having two outwardly salient teeth disposed generally at 180 degrees with respect to each other is disposed for rotation in the central bore. Each of the rotor teeth has a shoulder along its radially outermost surface so as to provide first and second air gaps between the rotor teeth and the stator so that the rotor has a preferential direction of rotation. A permanent magnet is disposed adjacent the central bore at the end of the third stator tooth.

In a fifth aspect of the present invention the hybrid single-phase variable reluctance motor includes a stator having first, second, third and fourth inwardly salient teeth terminating at a central bore. A phase winding is operatively associated with the first and second stator teeth, the first and second stator teeth being diametrically disposed with respect to each other across the central bore. Energization of the phase winding causes a temporary magnetization of the first and second stator teeth. A rotor having two outwardly salient teeth disposed generally at 180 degrees with respect to each other is disposed for rotation in the central bore. Each of the rotor teeth has a shoulder along its radially outermost surface so as to provide first and second air gaps between the rotor teeth and the stator so that the rotor has a preferential direction of rotation. A permanent magnet is disposed adjacent the central bore at the end of the third stator tooth. And, a separate piece of material having a magnetic permeability substantially greater than that of air is secured in fixed geometrical relationship to one end of the rotor adjacent the rotor teeth but displaced rotationally therefrom a predetermined amount. The separate piece has a length substantially the same at the width of the rotor measured at the rotor teeth.

BRIEF DESCRIPTION OF THE DRAWINGS

FIGS. 6A–7A, and 7B are diagrammatic views of the motor of FIG. 1 with the rotor of FIG. 5 illustrating starting thereof;

Similar reference characters indicate similar parts throughout the several views of the drawings.

DESCRIPTION OF THE PREFERRED EMBODIMENTS

Figure 1:
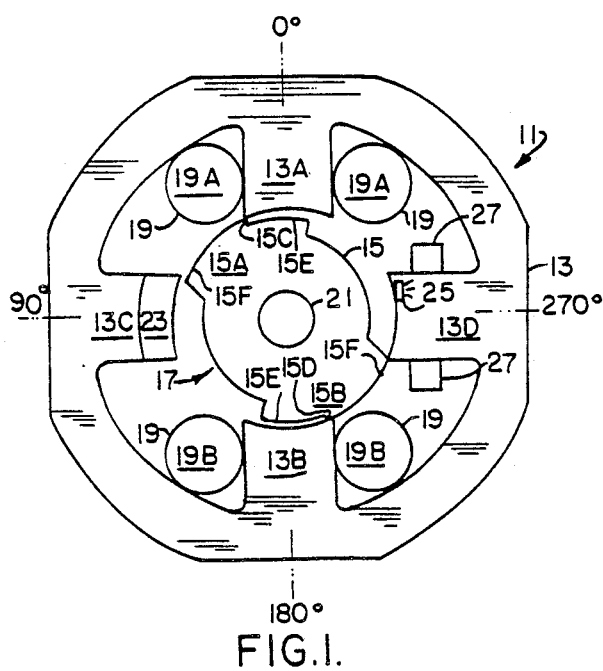
FIG. 1 is a diagrammatic view of a first embodiment of the hybrid, single-phase variable reluctance motor of the present invention.

A hybrid single-phase variable reluctance motor 11 (FIG. 1) of the present invention includes a stator 13 and a rotor 15. Stator 13 has first, second, third and fourth inwardly salient teeth 13A, 13B, 13C, and 13D terminating at a central bore indicated generally at 17. The four stator teeth are generally evenly spaced around central bore 17. Specifically, the stator teeth are spaced ninety degrees apart around the central bore, with opposed teeth being diametrically disposed with respect to each other across the central bore.

A phase winding 19 is operatively associated with stator teeth 13A and 13B. Energization of phase winding 19, by means of the circuitry of FIGS. 3 and 4, causes a temporary magnetization of stator teeth 13A and 13B in the conventional manner. Winding 19 consists of two coils 19A and 19B, discussed below in conjunction with FIGS. 3A and 3B.

Rotor 15 has two outwardly salient teeth disposed generally at 180 degrees with respect to each other. The rotor is fixedly secured to a shaft 21 for rotation in central bore 17.

A permanent magnet 23 is disposed adjacent the central bore at the end of stator tooth 13C. As will become apparent, permanent magnet 23 provides a magnetic detent torque to cause the rotor to come to rest in a preferred position for starting the motor. The magnetic detent torque also provides torque for rotating the rotor during those portions of the operating cycle when the coil-excited reluctance torque is zero or negligible.

Opposite tooth 13C across the central bore, rotor position detecting means are disposed at stator tooth 13D for detecting the rotational position of rotor 15 in central bore 17. The rotor position detecting means preferably includes a unipolar Hall effect device or sensor 25. Alternatively, it can include a search coil 27.

The ends of stator teeth 13A, 13B, 13C and 13D are curved, while the ends of rotor teeth 15A and 15B also have a predetermined complementary curvature, as shown.

Permanent magnet 23 forms the end of stator tooth 13C and has a curvature complementary to the curvature of the rotor teeth, which minimizes the air gap between the magnet and the rotor teeth. Alternatively (see discussion of FIGS. 13 and 14), a less expensive block magnet can be used for magnet 23.

Magnet 23 is shown as being substantially the same width as the stator tooth on which it is mounted and as the rotor teeth. Alternatively, magnet 23 can be smaller than the stator tooth on which it is mounted, and/or the coil excited and magnet excited stator teeth can have different widths.

Note that there is only a single permanent magnet 23 disposed adjacent central bore 17. If the motor is considered as having two halves, divided generally along a line between stator teeth 13A and 13B, permanent magnet 23 is disposed in one half and there are no permanent magnets in the other half of the motor.

Each tooth of rotor 15 has a shoulder (labelled 15C and 15D in FIG. 1) along its radially outermost surface. These shoulders divide the outermost surface of each tooth into two portions 15E and 15F, portion 15F being farther from the center of rotor 15 than is portion 15E. As a result, there are provided two different air gaps (unlabelled on FIG. 1, but see similar air gaps $R_A$, $R_B$, and $R_C$ on FIG. 5) between the rotor teeth and the stator teeth.

The first gap, between portion 15F and the stator teeth, is designed to be as small as possible to maximize the reluctance effect in the motor during operation. The second air gap, between portion 15E and the stator teeth, is somewhat larger. The effect of having shoulders 15C and 15D is that the rotor has a preferential direction of rotation. How this occurs is explained below in detail in connection with FIGS. 6, 7 and 9.

Figure 2:
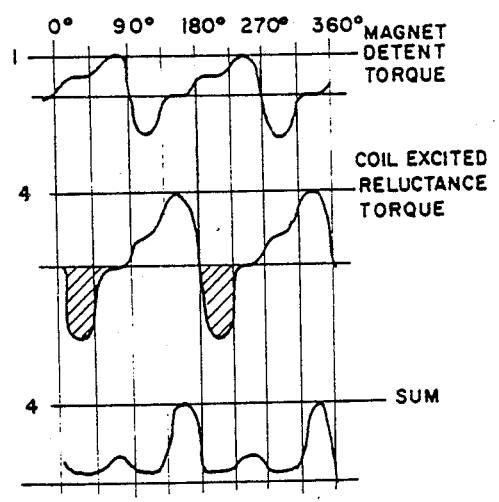
FIG. 2 is a graphical representation of the torques in a motor such as that of FIG. 1.

The torque profiles resulting from permanent magnet 23 and winding 19, along with their sum is shown in FIG. 2. Note that in this Fig. the scales differ for the magnet detent torque on the one hand and for the coil excited torque and the sum on the other. The magnet detent torque is of a much smaller absolute magnitude than the coil excited torque. Of course, the exact magnet detent torque curve will depend on the strength and placement of magnet 23 and the configuration of rotor 15.

Although the curve for the magnet detent torque includes some negative portions, the sum of that torque and the coil excited torque is always positive, in part because of the difference in magnitudes of the two torques.

With respect to the coil excited torque, the curve also shows positive and negative portions, the negative portions being cross-hatched. This curve represents the torque on rotor 15 assuming that winding 19 is always energized. Of course, suitable control circuitry is provided (see, for example, FIG. 4) so that the winding is not energized during those portions of the cycle in which the coil excited torque would be negative. Thus, the cross-hatched portion of the coil excited torque curve is not actually seen by rotor 15. The torque sum curve at the bottom of FIG. 2 takes this into account.

Figure 3A:
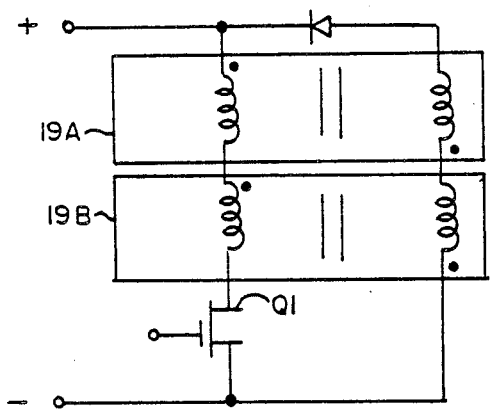
FIGS. 3A and 3B are electrical schematics of phase windings and drive circuitry therefore for the motor of FIG. 1.
Figure 3B:
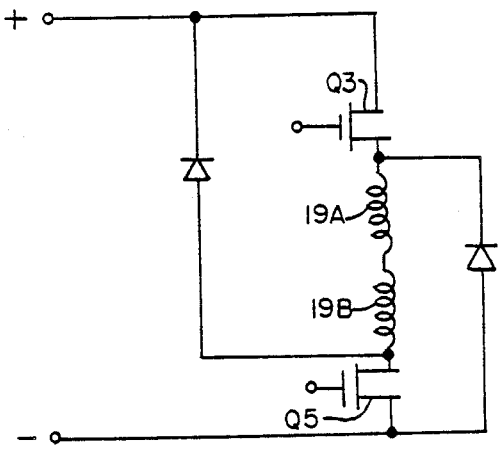

The coils of winding 19 are shown in FIGS. 3A and 3B. In FIG. 3A, winding 19 consists of two bifilar coils 19A and 19B. When bifilar coils are used, a single power switch Q1 is used to control application of power to the winding.

When standard coils 19A and 19B are used (see FIG. 3B), a pair of power switches Q3 and Q5 control application of power to the winding.

Figure 4:
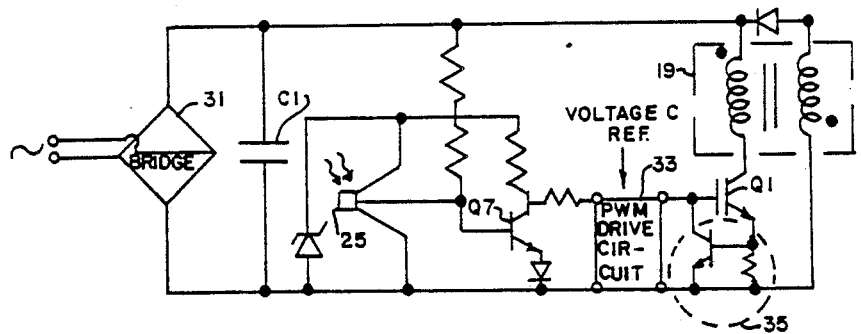
FIG. 4 is an electrical schematic of the motor of FIG. 1 and associated circuitry.

Switches Q1, Q3 and Q5 are electronically controlled by control circuitry such as that shown in FIG. 4. Specifically, FIG. 4 shows a bifilar winding 19 connected in series with control switch Q1 across the output of a rectifier bridge 31. The input of bridge 31 is connected to a suitable source of AC power, and its output is smoothed by a capacitor C1, all in the conventional manner.

Rotor position information is supplied to the circuitry of FIG. 4 by unipolar Hall effect device 25. This device is shown configured in the current sinking output mode in which the output voltage (on the middle of the three leads from device 25) is High when little or no flux is present and is Low when flux is present.

When no flux is present, the High output of Hall effect device 25 keeps a pnp-type transistor Q7 from conducting while the rotor teeth are not in the vicinity of the Hall effect device. For example, the output of device 25 is High when the rotor is in the position shown in FIG. 1.

Figure 6A:
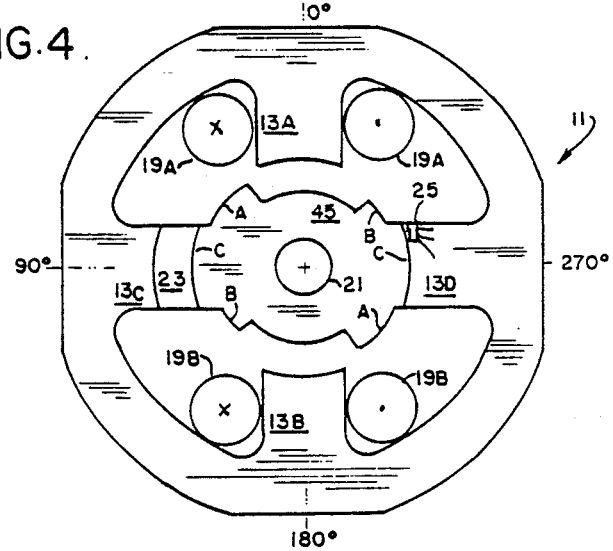

When one of the rotor teeth rotate into the vicinity of the Hall effect device (such as shown in FIG. 6A, for example), the output of device 25 goes Low and transistor Q7 conducts.

Conduction of transistor Q7 causes power switch Q1 to conduct as well, energizing winding 19. A pulse width modulating drive circuit 33 is disposed between transistor Q7 and power switch Q1 to regulate the voltage applied to the winding. Circuit 33 controls the applied voltage in response to a motor voltage reference signal in conventional manner.

The circuitry of FIG. 4 also includes a current limit circuit 35 connected between power switch Q1 and the negative side of rectifier bridge 31.

Figure 5:
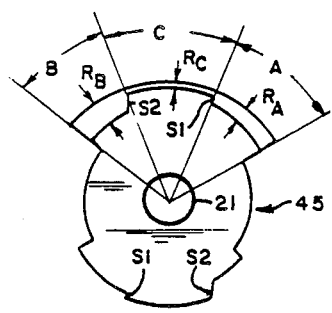
FIG. 5 a diagrammatic view of one embodiment of a rotor for the motor of FIG. 1.

A second embodiment of the rotor, labelled 45, is shown in FIG. 5. Instead of a single shoulder and two air gaps, rotor 45 has two shoulders S1 and S2 of differing depths and three air gaps $R_A$, $R_B$, and $R_C$. The airgaps are exaggerated for clarity. Rotor 45 is designed to rotate in the counter-clockwise (CCW) direction as seen in the Figs.

Each tooth of rotor 45 is divided into three arcs A, B, and C (with the associated air gaps $R_A$, $R_B$, and $R_C$) by shoulders S1 and S2. Of the three gaps, gap $R_C$ is the smallest, gap $R_A$ is the next smallest and gap $R_B$ is the largest.

The width of gap $R_A$ is chosen to provide enough fringe flux to Hall effect device 25 to keep the device output Low while arc A of rotor 45 is passing by the Hall effect device. The length of arc A is selected so as to correspond with the desired switching point for winding 19. This maintains the phase current in winding 19 for a long dwell time until the rate of rise of the inductance maximizes in the CCW direction. This arc keeps the Hall effect device activated for a predetermined amount of rotation of the rotor.

Arc B of rotor 45 is the running start gap on the CCW side of the rotor. It is important that air gap $R_B$ for this arc is large enough so that fringing flux through this gap does not turn Hall effect device 25 on. Arc B could be eliminated, but its presence does provide two advantages. First, it gives an increased rate of rise of inductance so more torque is generated as current is rising during the CCW running cycle. Second, it increases the starting torque in the CCW direction for starting.

Arc C, since it has the minimum air gap, provides the main running torque for the motor.

Operation of motor 11 with rotor 45 is illustrated in FIGS. 6A–6C, 7A and 7B. FIG. 6A illustrates a typical rest position for rotor 45 in which one of the rotor teeth is aligned with permanent magnet 23. This is, of course, one of the two minimum reluctance positions for the magnet excited poles.

When power is applied to the circuitry of FIG. 4, Hall effect device 25 sees flux due to magnet 23. The output of device 25, therefore, is in the Low state. The prescribed voltage is applied by the circuitry of FIG. 4 to phase winding 19. Current builds up ("X" indicates current flowing into the page in the drawings) until sufficient coil excited flux is created to produce a coil excited reluctance torque greater than the magnet detent torque. As a result rotor 45 begins rotating clockwise to the position shown in FIG. 6B.

Figure 6B:
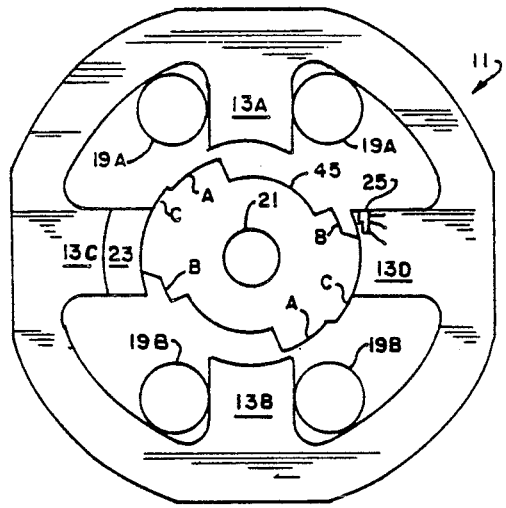
Figure 6C:
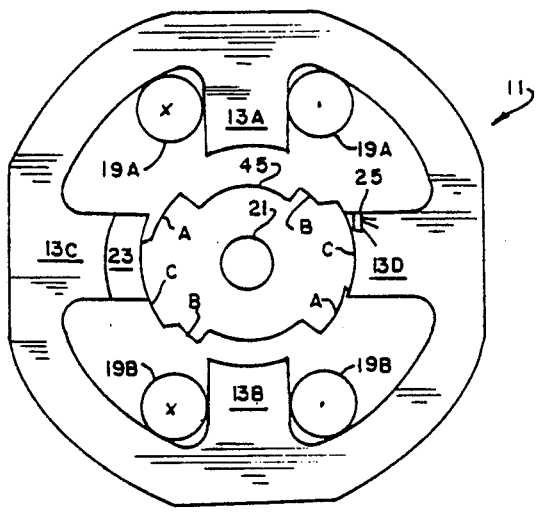

Once the rotary position shown in FIG. 6B is reached, the Hall effect device output goes High, since air gap $R_B$ does not allow enough flux to reach the device. This shuts off the phase voltage and the current through the winding begins to decay. The torque caused by permanent magnet 23 pulls rotor 45 back CCW. Because of momentum, rotor 45 overshoots the position shown in FIG. 6A and reaches the position shown in FIG. 6C. During this motion, the output of Hall effect device 25 turns Low. As a result the phase voltage is applied and current through the windings builds. Flux due to the phase current pulls the rotor in the CCW direction, the desired direction of rotation.

Rotor 45 continues CCW rotation under the influence of the reluctance torque due to the phase current. The output of Hall effect device 25 remains Low until the position shown in FIG. 7A is reached (because the air gap $R_A$ is sufficiently small to allow flux to continue activating the Hall effect device while arc A is passing device 25).

Figure 7A:
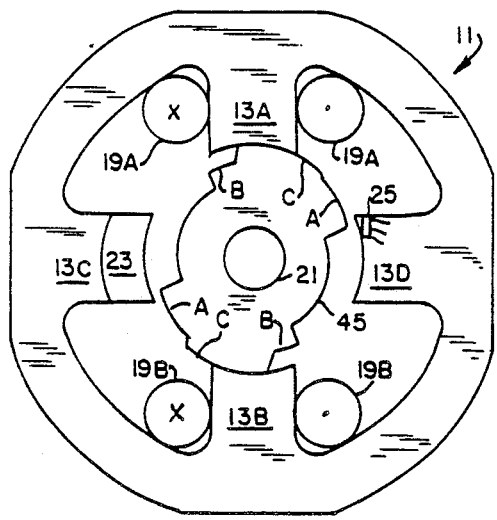
Figure 7B:
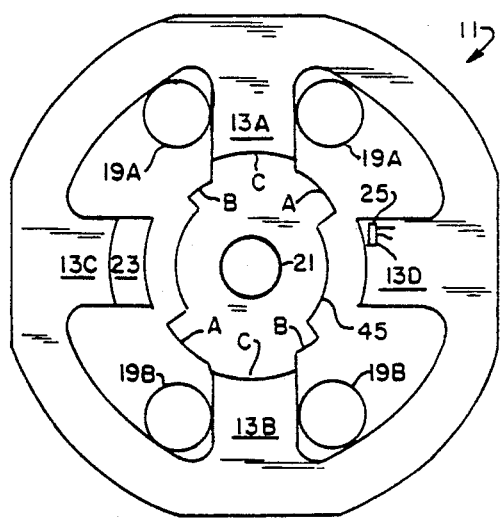

Once the position shown in FIG. 7A is reached, however, the output of Hall effect device 25 goes High. The phase voltage drops to zero, and the phase current decays slowly so that reluctance torque continues until approximately full alignment of the rotor teeth with stator teeth 13A and 13B (shown in FIG. 7B).

At this point, phase current is zero. The torque due to permanent magnet 23 now causes the rotor to rotate an additional ninety degrees CCW.

At the end of this rotation, arc C is aligned with the Hall effect device. Voltage is applied to phase winding 19 again and CCW rotation of rotor 45 continues.

Figure 8:
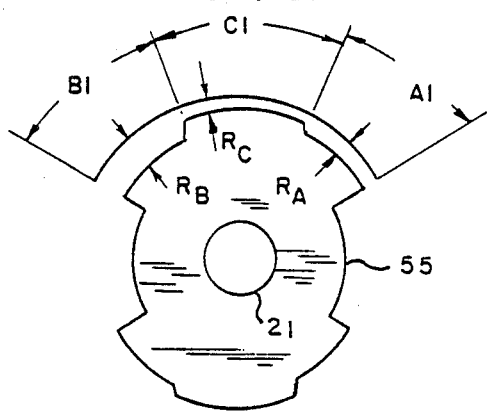
FIG. 8 is a diagrammatic view of a second embodiment of a rotor for a motor of the present invention.

A second three-gap design of the rotor, labelled rotor 55, is shown in FIG. 8. This particular design results in a smoother, one-direction start. All motion with this rotor is in the CCW direction, even during starting. Rotor 55, like rotor 45, has three air gaps $R_A$, $R_B$, and $R_C$, but the lengths of the three arcs (labelled A1, B1, and C1 for rotor 55) of the rotor differ from those of rotor 45.

Specifically, it is preferred that certain relationships between arcs A1, B1, and C1 exist in order to, among other things, maintain the difference between minimum and maximum permeance. For example, it is preferred that the difference between 180 degrees and the sum of arcs A1 and B1 (measured in degrees) be equal to or greater than 2.3 times arc C1 (measured in degrees).

As with rotor 45, air gap $R_B$ of rotor 55 must be great enough that the flux across that gap does not cause the output of Hall effect device 25 to go Low. The output of the Hall effect device must not go from High to Low as arc B1 passes the device because that would cause the phase voltage and current to turn on prematurely, resulting in a large current rise.

Similarly, air gap $R_A$ corresponding to arc A1 must be small enough so that the flux across the gap does cause the output of the Hall effect device to be Low.

Because of this difference in air gaps $R_A$ and $R_B$, arc B1 must be larger than arc A1 so that the rate of change of permeance is initially higher in the CCW direction. This ensures that rotates starts in the CCW direction and stays in that direction.

Although air gap $R_A$ is sufficiently small to cause the output of Hall effect device 25 to be Low, that gap must not be as small as gap $R_C$. Gap $R_A$ must be greater than gap $R_C$ so that there is only one stable detent position due to permanent magnet 23.

Like the corresponding arc in rotor 45, arc C1 of rotor 55 provides the running torque for motor 11.

Figure 9A:
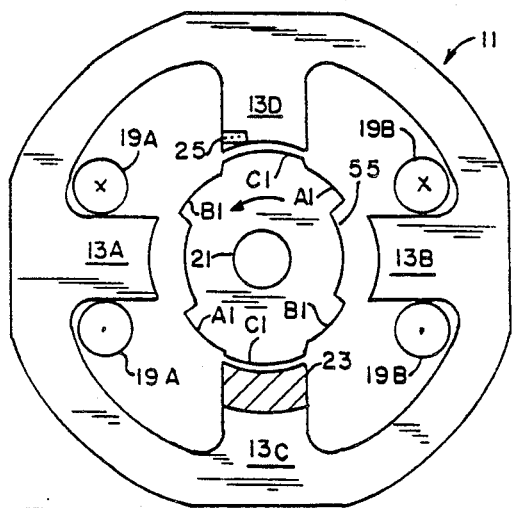
FIGS. 9A–9C are diagrammatic views of a motor of the present invention with the rotor of FIG. 8, illustrating starting thereof.
Figure 9B:
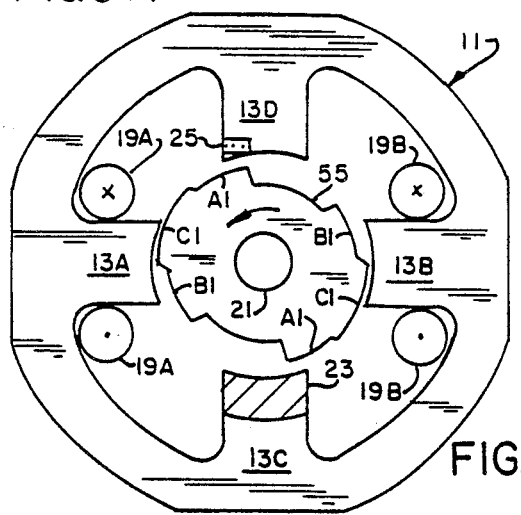
Figure 9C:
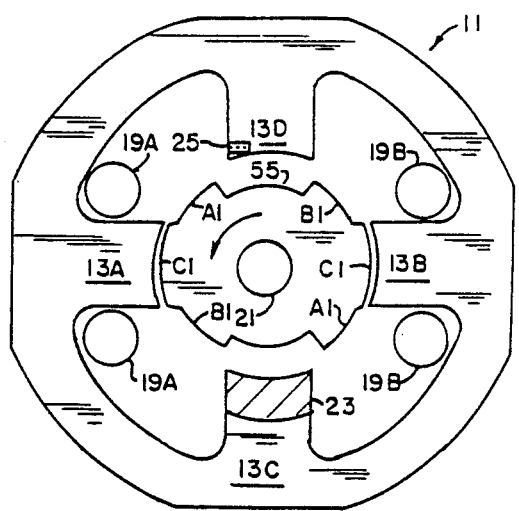

Starting of motor 11 with rotor 55 is illustrated in FIGS. 9A-9C. Starting occurs when the rotor is at the detent rest position shown in FIG. 9A. As power is turned on, Hall effect device 25 sees flux due to permanent magnet 23 and its output is in the Low state. As a result, the phase voltage is applied to phase winding 19. Phase current builds up until the resulting reluctance torque overcomes the detent torque and rotor 55 begins rotating CCW.

The rotor then rotates CCW until the flux detected by the Hall effect device reduces to the point where the output of device 25 goes High. This position is generally that shown in FIG. 9B. When the output of Hall effect device 25 goes High, the phase voltage goes to zero and the phase current starts to decay. Rotor 55 continues to rotate CCW due to momentum and the reluctance torque caused by the decaying current.

When rotor 55 reaches the position shown in FIG. 9C, phase current has decayed to zero. Now the torque due to permanent magnet 23 pulls the rotor CCW for another ninety degrees, at which point the configuration is basically that shown in FIG. 9A again. Rotation then continues so long as power is applied.

Figure 10:
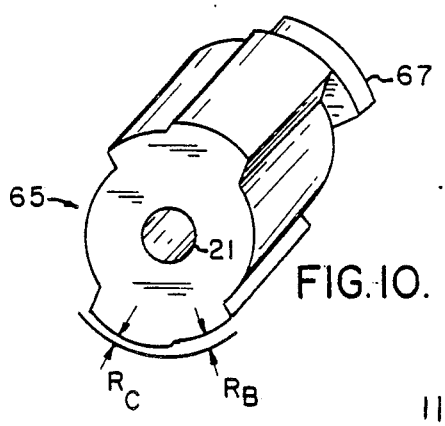
FIG. 10 is a perspective view of a third embodiment of a rotor for a motor of the present invention.
Figure 12:
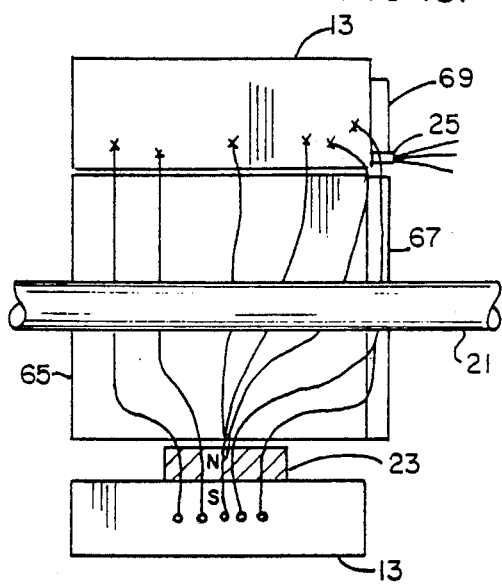
FIG. 12 is a cross-sectional view, with parts removed for clarity, illustrating the flux paths in the motor using the rotor of FIG. 10.
Figure 11:
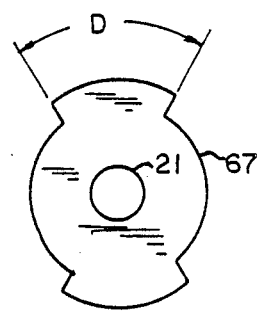
FIG. 11 is a diagrammatic view of a separate piece secured to the motor of FIG. 10.

A third embodiment of the present invention is illustrated in FIGS. 10-12. Except for an alternative rotor, labelled 65, the motor 11 of these Figs. is generally the same as that of the previous Figs.

Rotor 65 differs from the rotors discussed above in that it has an additional steel piece 67 secured to one end of the rotor stack so that it extends past stator 13 on the side of the stator under the Hall effect device (See FIG. 12).

Piece 67 simplifies the construction of the rotor in several ways. Because the flux through the Hall effect device 25 is controlled by the arc of separate piece 67, the rotor itself has only two gaps, $R_B$ and $R_C$, as shown in FIG. 10. Because the separate piece 67 may be secured to rotor 65 at any desired relative rotational position, there is provided increase flexibility in turn on/turn off positions for Hall effect device 25.

Specifically, the placement of the separate piece 67 determines the turn on/turn off positions for the Hall effect device, while the width D of the arc defined by piece 67 controls the number of degrees during which the Hall effect device remains in each state.

Moreover, the control over the amount of flux for the Hall effect device is increased. A smaller magnet 23 can be used for the same amount of flux.

This configuration also results in improved starting flexibility since it relieves constraints on both the length of the arc A in the previous rotors and on the length of arc B. The limitation of the length of arc B in degrees now becomes 180 degrees minus the length of arc B should be greater than or equal to 2.3 times the length of arc C, since the length of arc A is now zero.

Such a configuration also simplifies the design of motors 11 of various lengths since separate piece 67 makes it easier to insure proper flux levels through Hall effect device 25.

FIG. 12, while illustrating the structure of the motor of FIGS. 10-12, also shows some features common to all embodiments of the motor. For example, it is desirable to have a flux concentrator 69, such as a piece of any magnetic steel disposed behind Hall effect device 25 to ensure proper flux levels through the device. Device 25 is, as discussed above in connection with the other embodiments, disposed at stator tooth 13D. As shown in FIG. 12, it is mounted at one axial end of that stator tooth adjacent the central bore.

FIG. 12 also illustrates the fact that both the stator and the rotor of motor 11 are made up of laminations in the conventional manner.

Permanent magnet 23 is shown axially centered on its stator tooth in FIG. 12. Other configurations are possible, but they can result in axial forces being applied which are undesirable.

Figure 13:
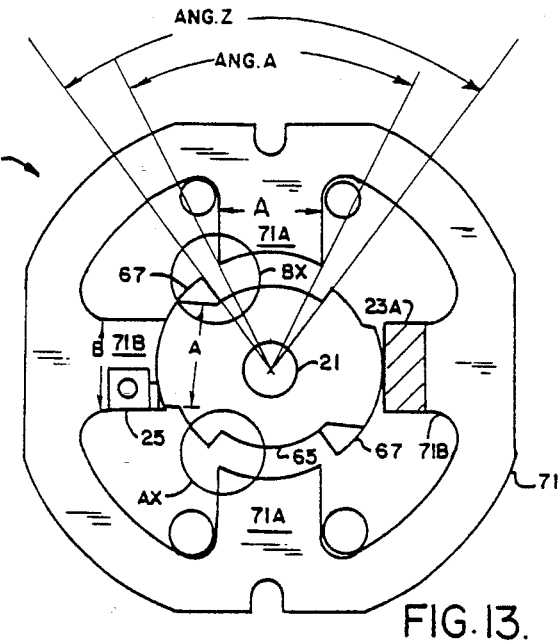
FIG. 13 is a diagrammatic view of a fourth embodiment of the motor of the present invention.

A fourth embodiment of the motor 11 is illustrated in FIGS. 13 and 14. This embodiment uses rotor 65 and backplate 67 of FIGS. 10-12 with a stator having several unique features. Stator 71 of FIGS. 13 and 14 instead of having a shaped magnet 23 has a flat block magnet 23A at the end of stator tooth 71B. Flat block magnets offer lower cost for about the same performance in detent torque. These magnets may be used in any of the embodiments of the present invention instead of the shaped magnet 23 if desired.

The motor of FIGS. 13 and 14 also differs from the other embodiments in that the coil-excited salient poles 71A have a width greater than the width of the magnet excited salient poles 71B. That is, width "A" shown on FIG. 13 is greater than width "B."

Figure 14A:
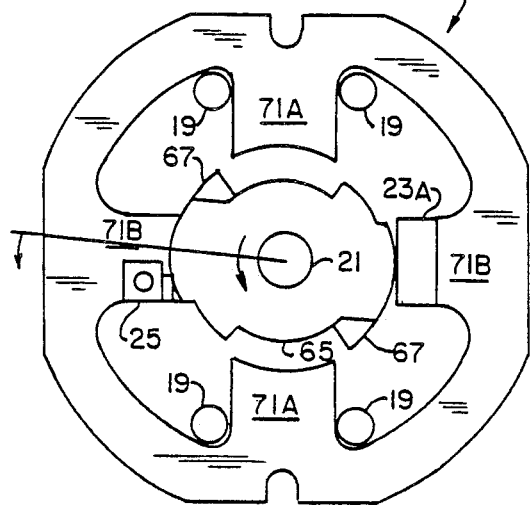
FIGS. 14A and 14B are diagrammatic views of the motor of FIG. 13 illustrating different stable or detent positions thereof.
Figure 14B:
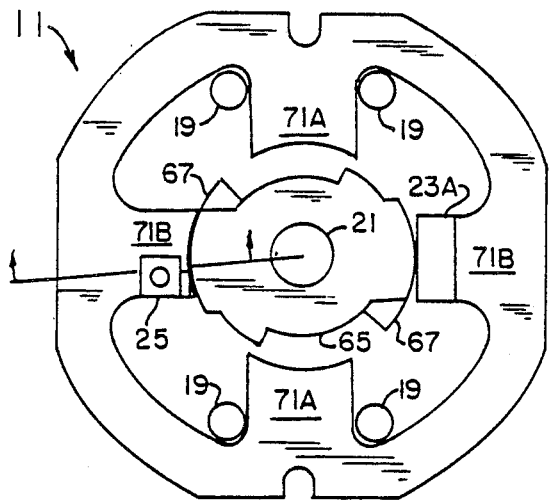

With such an arrangement, there are multiple stable or detent positions, such as the two different detent positions shown in FIGS. 14A and 14B. The worst case position for starting torque is that shown in FIG. 14A. Any other angular position between those shown in FIGS. 14A and 14B will improve starting torque over that resulting when the rotor has stopped in the position illustrated in FIG. 14A.

To ensure that a continuous start in one direction is accomplished with the motor of FIGS. 13 and 14, the reluctance at the area labelled AX in FIG. 13 must be less than the reluctance at the area labelled BX. Moreover, in order to get good overall performance, the angle ANGZ in FIG. 13 should be at least 1.3 times as large as the angle ANGA to maintain good min-max reluctance ratios.

From the description of all four embodiments of motor 11, it should be seen that the magnet-salient pole arrangement in all embodiments offer the ability to fill-in torque during the zones when coils 19 are off. This reduces the ratio of torque ripple/average torque in a unique manner with a resulting valuable reduction in the resonant noise of the mechanical system of the motor.

In view of the above, it will be seen that the various objects and features of the present invention are achieved and other advantageous results are obtained. As various changes could be made in the above constructions and methods without departing from the scope of the invention, it is intended that all matter contained in the above description and shown in the accompanying drawings shall be interpreted as illustrative and not in a limiting sense.

What is claimed is:

1. A hybrid single-phase variable reluctance motor comprising:
   a stator having first, second, third and fourth inwardly salient teeth terminating at a central bore, said four stator teeth being generally evenly spaced around said central bore;
   a phase winding operatively associated with the first and second stator teeth, said first and second stator teeth being diametrically disposed with respect to each other across the central bore, said phase winding when energized causing a temporary magnetization of the first and second stator teeth;
   a rotor having two outwardly salient teeth disposed generally at 180 degrees with respect to each other, said rotor being disposed for rotation in said central bore;
   a permanent magnet disposed adjacent the central bore at the end of the third stator tooth; and
   rotor position detecting means disposed at the fourth stator tooth for detecting the rotational position of the rotor in the central bore.

2. The variable reluctance motor as set forth in claim 1 wherein the rotor position detecting means includes a Hall effect sensor.

3. The variable reluctance motor as set forth in claim 1 wherein the rotor position detecting means includes a search coil.

4. The variable reluctance motor as set forth in claim 1 wherein each rotor tooth has a predetermined curvature, the end of the permanent magnet facing the central bore having a curvature complementary to the curvature of the rotor teeth.

5. The variable reluctance motor as set forth in claim 1 wherein the end of the permanent magnet adjacent the central bore forms the end of the third stator tooth.

6. The variable reluctance motor as set forth in claim 5 wherein the end of the permanent magnet adjacent the central bore is planar.

7. The variable reluctance motor as set forth in claim 1 wherein the first and second stator teeth are wider than the third and fourth stator teeth.

8. The variable reluctance motor as set forth in claim 1 wherein the angle subtended by that portion of the rotor between the rotor teeth, as measured from the rotational axis of the motor, is greater than the angle subtended by the first stator tooth.

9. The variable reluctance motor as set forth in claim 8 wherein the angle subtended by that portion of the rotor between the rotor teeth is at least 1.3 times the angle subtended by the first stator tooth.

10. A hybrid single-phase variable reluctance motor comprising:
    a stator having first, second, third and fourth inwardly salient teeth terminating at a central bore;
    a phase winding operatively associated with the first and second stator teeth, said first and second stator teeth being diametrically disposed with respect to each other across the central bore, said phase winding when energized causing a temporary magnetization of the first and second stator teeth;
    a rotor having two outwardly salient teeth disposed generally at 180 degrees with respect to each other, said rotor being disposed for rotation in said central bore; and
    a permanent magnet disposed adjacent the central bore at a location on one side of a line drawn between the first and second stator teeth, there being no permanent magnet on the other side of said line drawn between the first and second stator teeth, said permanent magnet being disposed at the end of the third stator tooth.

11. The variable reluctance motor as set forth in claim 10 further including rotor position detecting means disposed at the fourth stator tooth for detecting the rotational position of the rotor in the central bore.

12. The variable reluctance motor as set forth in claim 10 wherein each rotor tooth has a predetermined curvature, the end of the permanent magnet facing the central bore having a curvature complementary to the curvature of the rotor teeth.

13. The variable reluctance motor as set forth in claim 10 wherein the end of the permanent magnet adjacent the central bore forms the end of the third stator tooth.

14. The variable reluctance motor as set forth in claim 10 wherein the permanent magnet is disposed generally ninety degrees from both the first and the second stator teeth.

15. A hybrid single-phase variable reluctance motor comprising:
    a stator having first, second, third and fourth inwardly salient teeth terminating at a central bore, said four teeth being generally evenly spaced around said central bore;
    a phase winding operatively associated with the first and second stator teeth, said first and second stator teeth being diametrically disposed with respect to each other across the central bore, said phase winding when energized causing a temporary magnetization of the first and second stator teeth;

a rotor having two outwardly salient teeth disposed generally at 180 degrees with respect to each other, said rotor being disposed for rotation in said central bore; and a permanent magnet disposed adjacent the central bore at the end of the third stator tooth, said permanent magnet being generally ninety degrees from each of the first and second stator teeth.

16. The variable reluctance motor as set forth in claim 15 further including rotor position detecting means disposed at the fourth stator tooth for detecting the rotational position of the rotor in the central bore.

17. The variable reluctance motor as set forth in claim 15 wherein each rotor tooth has a predetermined curvature, the end of the permanent magnet facing the central bore having a curvature complementary to the curvature of the rotor teeth.

18. A hybrid single-phase variable reluctance motor comprising:

a stator having first, second, third and fourth inwardly salient teeth terminating at a central bore;

a phase winding operatively associated with the first and second stator teeth, said first and second stator teeth being diametrically disposed with respect to each other across the central bore, said phase winding when energized causing a temporary magnetization of the first and second stator teeth;

a rotor having two outwardly salient teeth disposed generally at 180 degrees with respect to each other, said rotor being disposed for rotation in said central bore, each of said rotor teeth having a shoulder along its radially outermost surface so as to provide first and second air gaps between the rotor teeth and the stator, whereby the rotor has a preferential direction of rotation; and a permanent magnet disposed adjacent the central bore at the end of the third stator tooth.

19. The variable reluctance motor as set forth in claim 18 further including rotor position detecting means disposed at the fourth stator tooth for detecting the rotational position of the rotor in the central bore.

20. The variable reluctance motor as set forth in claim 18 wherein each rotor tooth has a predetermined curvature, the end of the permanent magnet facing the central bore having a curvature complementary to the curvature of the rotor teeth.

21. The variable reluctance motor as set forth in claim 18 wherein the permanent magnet is disposed generally ninety degrees from both the first and the second stator teeth.

22. The variable reluctance motor as set forth in claim 18 wherein each rotor tooth has a pair of shoulders of differing depths so as to provide first, second and third air gaps between the rotor teeth and the stator.

23. The variable reluctance motor as set forth in claim 22 further including a Hall effect device disposed at the fourth stator tooth for detecting the rotational position of the rotor in the central bore, said Hall effect device being mounted at one axial end of the fourth stator tooth adjacent the central bore, further including a flux concentrator disposed behind the Hall effect device.

24. The variable reluctance motor as set forth in claim 22 further including a Hall effect device disposed at the fourth stator tooth for detecting the rotational position of the rotor in the central bore, said Hall effect device being mounted at one axial end of the fourth stator tooth adjacent the central bore.

25. The variable reluctance motor as set forth in claim 24 wherein the rotor tooth shoulders when viewed from the center of the rotor define first, second, and third arcs corresponding to the first, second, and third air gaps.

26. The variable reluctance motor as set forth in claim 25 wherein the difference between 180 degrees and the sum of the first and second arcs is substantially equal to or greater than 2.3 times the third arc.

27. The variable reluctance motor as set forth in claim 25 wherein the first arc is larger than the second arc and the first air gap is larger than the second air gap.

28. The variable reluctance motor as set forth in claim 25 wherein the first air gap is larger than the second air gap, the first air gap being too large to activate the Hall effect device and the second air gap being small enough to activate the Hall effect device.

29. The variable reluctance motor as set forth in claim 28 wherein the size of the second arc corresponds to the decay characteristics of the phase winding so as to keep the Hall effect device activated for a predetermined amount of rotation of the rotor.

30. The variable reluctance motor as set forth in claim 25 wherein the second air gap is substantially larger than the third air gap so that the third gap determines a detent position of the rotor.

31. A hybrid single-phase variable reluctance motor comprising:

a stator having first, second, third and fourth inwardly salient teeth terminating at a central bore;

a phase winding operatively associated with the first and second stator teeth, said first and second stator teeth being diametrically disposed with respect to each other across the central bore, said phase winding when energized causing a temporary magnetization of the first and second stator teeth;

a rotor having two outwardly salient teeth disposed generally at 180 degrees with respect to each other, said rotor being disposed for rotation in said central bore, each of said rotor teeth having a shoulder along its radially outermost surface so as to provide first and second air gaps between the rotor teeth and the stator, whereby the rotor has a preferential direction of rotation;

a permanent magnet disposed adjacent the central bore at the end of the third stator tooth; and a separate piece of material having a magnetic permeability substantially greater than that of air secured in fixed geometrical relationship to one end of the rotor adjacent the rotor teeth but displaced rotationally therefrom a predetermined amount, said separate piece having a length substantially the same at the width of the rotor measured at the rotor teeth.

32. The hybrid single-phase variable reluctance motor as set forth in claim 31 wherein that portion of the rotor tooth defining the first air gap subtends a first arc as measured from the rotor center, that portion of the rotor tooth defining the second air gap subtends a second arc as measured from the rotor center, and said separate piece subtends a third arc as measured from the rotor center.

33. The hybrid single-phase variable reluctance motor as set forth in claim 32 wherein the difference between 180 degrees and the first arc is substantially equal to or greater than 2.3 times the second arc.

34. The hybrid single-phase variable reluctance motor as set forth in claim 33 wherein the arc subtended by the separate piece is substantially independent of the values of the first and second arcs.

35. The hybrid single-phase variable reluctance motor as set forth in claim 31 wherein the permanent magnet is axially centered with respect to the third stator tooth.

* * * * *